United States Patent
Peterson et al.

(10) Patent No.: US 10,159,261 B2
(45) Date of Patent: Dec. 25, 2018

(54) FREEZE-DRIED, AERATED DAIRY OR DAIRY-SUBSTITUTE COMPOSITIONS AND METHODS OF MAKING THEREOF

(71) Applicant: Nestec S. A., Vevey (CH)

(72) Inventors: Scott Peterson, Spring Lake, MI (US); Frank Welch, Kentwood, MI (US); Thomas Burkholder, East Amherst, NY (US); Norman Jager, Albany, OR (US); Giovanna Alemán, Corvallis, OR (US)

(73) Assignee: Nestec S. A., Vevey (CH)

( * ) Notice: Subject to any disclaimer, the term of this patent is extended or adjusted under 35 U.S.C. 154(b) by 487 days.

(21) Appl. No.: 15/067,446

(22) Filed: Mar. 11, 2016

(65) Prior Publication Data
US 2016/0192670 A1    Jul. 7, 2016

Related U.S. Application Data

(63) Continuation of application No. 12/599,321, filed as application No. PCT/US2008/063312 on May 9, 2008.

(60) Provisional application No. 60/916,949, filed on May 9, 2007.

(51) Int. Cl.
| A23C 9/13 | (2006.01) |
| A23C 9/123 | (2006.01) |
| A23C 9/137 | (2006.01) |
| A23C 9/152 | (2006.01) |
| A23C 9/154 | (2006.01) |

(52) U.S. Cl.
CPC .......... *A23C 9/1232* (2013.01); *A23C 9/1307* (2013.01); *A23C 9/137* (2013.01); *A23C 9/1524* (2013.01); *A23C 9/1546* (2013.01); *A23C 2240/20* (2013.01)

(58) Field of Classification Search
None
See application file for complete search history.

(56) References Cited

U.S. PATENT DOCUMENTS

| 2,955,943 A | 10/1960 | Morgan et al. |
| 3,313,032 A | 4/1967 | Malecki |
| 3,492,126 A | 1/1970 | Rubenstein |
| 3,806,610 A | 4/1974 | Rahman |
| 4,055,675 A | 10/1977 | Popper et al. |
| 4,244,981 A | 1/1981 | Blake |
| 4,368,211 A | 1/1983 | Blake et al. |
| 4,386,211 A | 5/1983 | Henderson et al. |
| 4,515,822 A | 5/1985 | Kraig et al. |
| 4,542,035 A | 9/1985 | Huang et al. |
| 4,587,130 A | 5/1986 | Stauber |
| 4,624,853 A | 11/1986 | Rudin |
| 4,631,196 A | 12/1986 | Zeller |
| 4,702,923 A | 10/1987 | Tokumaru et al. |
| 4,851,239 A | 7/1989 | Amen et al. |
| 4,855,155 A | 8/1989 | Cavallin |
| 4,889,730 A | 12/1989 | Roberts et al. |
| 4,891,235 A | 1/1990 | Mizuguchi et al. |
| 4,946,697 A | 8/1990 | Payne |
| 4,948,609 A | 8/1990 | Nafisi-Movaghar |
| 4,956,185 A | 9/1990 | Cajigas |
| 5,000,974 A | 3/1991 | Albersmann |
| 5,143,096 A | 9/1992 | Steinberg |
| 5,665,413 A | 9/1997 | Rossiter |
| 5,959,128 A | 9/1999 | Kostad et al. |
| 6,361,813 B1 | 3/2002 | Kitaoka et al. |
| 6,713,100 B1 | 3/2004 | Schmoutz et al. |
| 6,841,181 B2 | 1/2005 | Jager et al. |
| 7,005,157 B2 | 2/2006 | Engesser et al. |
| 7,033,634 B2 | 4/2006 | Engesser et al. |
| 7,118,772 B2 | 10/2006 | Froseth et al. |
| 7,264,835 B2 | 9/2007 | Funk |
| 2002/0192435 A1 | 12/2002 | Kepplinger et al. |
| 2003/0113436 A1 | 6/2003 | Fukinbara |
| 2003/0194468 A1 | 10/2003 | Konkoly et al. |
| 2004/0109933 A1 | 6/2004 | Roy et al. |
| 2004/0110442 A1 | 6/2004 | Rhim et al. |
| 2004/0161522 A1 | 8/2004 | Toves |
| 2006/0286270 A1 | 12/2006 | Jordan |
| 2007/0071866 A1 | 3/2007 | Cox |
| 2009/0324773 A1 | 12/2009 | Peterson et al. |

FOREIGN PATENT DOCUMENTS

| CA | 994158 | 8/1976 |
| CA | 2183168 | 9/1995 |
| DE | 1149975 | 6/1963 |
| EP | 0331281 | 9/1989 |
| EP | 0461718 | 12/1991 |
| EP | 0649599 | 4/1995 |
| ES | 2001820 | 6/1988 |
| FR | 2019776 | 7/1970 |
| FR | 2079776 | 11/1971 |

(Continued)

OTHER PUBLICATIONS

Beech-Nut (Beech-Nut Carrot, Apple & Mango. 2006. http://web.archive.org/web/20061015193054/http://www.beech-nut.com/Our%20Baby%20Food/product.asp?P=38562&Cateogry=1&SearchValue=4&SearchVals=About%207%20-%208%20Month&ListValue=1&SearchType=By%20Age&ProdType=on Jun. 25, 2013.
Functional Foods Fact Sheet: Probiotics and Prebiotics Oct. 15, 2009. Downloaded from http://www.foodinsight.org/Resources/Detail.aspx?topic=Functional_Foods_Sheet_Probiotics_and_Prebioics on Aug. 16, 2012.
Gerber Graduates. MiniFruits & MiniVeggies. 2005. http://web.archive.org/web/20051026002915/http://gerber.com/toddlersite?tmsdir=food&tmspage=grad_mini.html&tmspromo=2 Downloaded Dec. 8, 2011.
Gerber. Graduates Yogurt Melts—Strawberry. Dec. 18, 2010, pp. 2 http://web.archive.org/web/20101218155236/http://www.gerber.com/AllStages/products/snacks/yogurt_melts_strawberry.aspx.

(Continued)

*Primary Examiner* — D. Lawrence Tarazano
*Assistant Examiner* — Stephanie A Cox
(74) *Attorney, Agent, or Firm* — Dunlap Codding, P.C.

(57) ABSTRACT

Freeze-dried, aerated yogurt products that include dairy or dairy-substitute compositions and an emulsifier are disclosed, along with methods of producing and using same.

20 Claims, No Drawings

(56) References Cited

FOREIGN PATENT DOCUMENTS

| | | |
|---|---|---|
| GB | 1070060 | 5/1967 |
| GB | 1129804 | 10/1968 |
| GB | 1343640 | 1/1974 |
| HU | 195094 | 4/1988 |
| JP | 62083842 | 4/1987 |
| JP | 6314658 | 1/1988 |
| JP | 02286039 | 11/1990 |
| JP | 9313101 | 12/1997 |
| JP | 2000210042 | 8/2000 |
| JP | 200234462 | 2/2002 |
| JP | 200145968 | 2/2004 |
| JP | 2004236612 | 8/2004 |
| JP | 2005053049 | 3/2005 |
| JP | 200550499 | 10/2005 |
| JP | 2009148254 | 7/2009 |
| JP | 2011032673 | 2/2011 |
| RU | 1837787 | 8/1993 |
| SU | 800538 | 1/1981 |
| WO | WO198912407 | 12/1989 |
| WO | 200060950 | 10/2000 |
| WO | 2001006865 | 2/2001 |
| WO | 2001019203 | 3/2001 |
| WO | 2001062099 | 8/2001 |
| WO | 2004040991 | 5/2004 |
| WO | 2006017363 | 2/2006 |
| WO | 2008141229 | 11/2008 |
| WO | 2008141233 | 11/2008 |

OTHER PUBLICATIONS

Harmon, Emily; "Gerber Graduates Yogurt Melts: Natural Snacking for Toddlers,"; (Jun. 2, 2008); 3 pages; http://voices.yahoo.com/gerber-graduates-yogurt-melts-natural-snacking-for-1526861.html?cat=25.

McGee; "On Food and Cooking," (2004); Scribner; pp. 20, 21, 632, and 633.

Nestle Baby. Gerber Graduates Yogurt Melts. 2007. http://web.nestlebaby.com/sg/baby_nutrition/Products/product_detail.htm?stage=0&id=2950; 1 page.

Stevens, A.; "Inulin and Food: Are You Eating Inulin Unknowingly?" The Diet Channel (2006) Downloaded Jul. 19, 2012 from http://www.thedietchannel.com/Inulin-and-Food-Are-You-Eating-Inulin-Unknowingly.htm.

Tsen, et al.; "Density of banana puree as a function of soluble solids concentration and temperature," J. Food Eng. (2002), vol. 55. pp. 305-308.

EP12004794.9; European Search Report; dated Aug. 3, 2012.

Gerber Graduates Mini Fruits Snacks. Found on http://www.gerber.com/Products/Mini_Fruits.aspx#. Aug. 27, 2009.

International Search Report, dated Jun. 26, 2008, in PCT/US2008/053582, filed Feb. 11, 2008.

FREEZE-DRIED, AERATED DAIRY OR DAIRY-SUBSTITUTE COMPOSITIONS AND METHODS OF MAKING THEREOF

CROSS REFERENCE TO RELATED APPLICATIONS/INCORPORATION BY REFERENCE STATEMENT

This application is a continuation of U.S. Ser. No. 12/599,321, filed Jan. 28, 2010; which is a national stage application filed under 35 USC § 371 of App No. PCT/US2008/063312, filed May 9, 2008; which claims priority to U.S. Ser. No. 60/916,949, filed May 9, 2007. The entire contents of the above-referenced patent applications are hereby expressly incorporated herein by reference.

BACKGROUND

Aerated milk compositions, such as aerated yogurt products are known in the art. Aeration can provide desirable characteristics such as light, fluffy textures. It is also known in the art that aerated products are subject to physical and chemical instability and therefore can destabilize over time. One solution to such instability issues in aerated milk-based products includes the addition of a hydrated emulsifier to already cultured dairy products before aeration (See e.g. U.S. Pat. No. 7,005,157, hereinafter "the '157 patent"). Specifically, the '157 patent teaches against adding ingredients directly to the milk blend prior to fermentation because such ingredients can adversely affect processing considerations such as fermentation times. The '157 patent teaches that the addition of a hydrated emulsifier post-fermentation avoids adversely lengthening fermentation times while contributing to stability. Freeze-drying is a process well known in the food industry. It is critical in further drying aerated products that the resulting product retains sensory attributes that are important to consumers. Using the invention taught in the '157 patent, hydration of the aerated product before freeze-drying can detrimentally affect physical stability. For example, a hydrated, aerated product when freeze-dried may result in increased fragility during shipping and handling of the product.

As a further example, dissolvability is an important issue in a freeze-dried product. Specifically, the aerated product, which has been dried and treated with air, nitrogen or other gases, must still remain readily dissolvable upon consumption at such a rate as to transfer flavor to the consumer's taste buds. Moreover, the product should be readily dissolvable to reduce the risk of choking hazards for consumers with restricted or under-developed oral motor skills or digestive functions. As a known solution, increasing the aeration can improve dissolvability. However, increased aeration has the negative effect of reducing the hardness of the end product. When the hardness is reduced beyond a certain level, the physical stability of product can be compromised.

Therefore, there is a need for a product that is freeze-dried and aerated that has improved physical stability and improved dissolvability.

DETAILED DESCRIPTION

The presently disclosed and/or claimed inventive concept(s) comprises a freeze-dried, aerated dairy or dairy-substitute composition comprising a dairy or dairy-substitute ingredient, an emulsifier, wherein said dairy or dairy-substitute composition is pasteurized, and methods of making thereof.

As used throughout, ranges are used as a shorthand for describing each and every value that is within the range. Any value within the range can be selected as the terminus of the range. When used, the phrase "at least one of" refers to the selection of any one member individually or any combination of the members. The conjunction "and" or "or" can be used in the list of members, but the "at least one of" phrase is the controlling language. For example, at least one of A, B, and C is shorthand for A alone, B alone, C alone, A and B, B and C, A and C, or A and B and C.

"Freeze-dry" is a dehydration process that works by freezing the material and then reducing the surrounding pressure to allow the frozen water in the material to sublimate directly from the solid phase to gas.

"Aeration" is the process of introducing air to increase gas concentration in liquids. Aeration may be performed by bubbling a gas through the liquid, spraying the liquid into the gas or agitation of the liquid to increase surface absorption.

"Dissolvability" is defined as the change in hardness of a product in going from a dry to a wet state.

"Hardness" is defined as the peak stress prior to fracturing a material. Universal Tester model 4465 with 100 N static load cell, manufactured by Instron in Canton, Mass., is used. The probe used for testing is a compression anvil #2830-011. Initial settings for speed of probe were 1 mm/second to approximately 90% compression. Speed based upon journal article in J. Texture Studies, 36 (2005), pp 157-173, "Effects of Sample Thickness of Bite Force for Raw Carrots and Fish Gels." Testing is repeated on 10-15 replicate samples for each variable.

"Viscosity" is defined as a measure of the resistance of a substance to flow. Viscosity is measured using a Brookfield viscometer with a Helipath® stand with an F-T bar before the composition is aerated. Viscosity aids in holding the shape of a substance through aeration and deposit.

The presently disclosed and/or claimed inventive concept(s) comprises a dairy or dairy substitute composition useful in the preparation of a freeze-dried, aerated product. The first component of the composition comprises a dairy or dairy substitute ingredient. The dairy or dairy substitute ingredient is selected from any dairy or dairy substitute ingredient ordinarily known in the art. Specifically, the dairy ingredient is selected from the group including but not limited to milk, milk powder, yogurt, skim milk and milk proteins and combinations thereof. The dairy substitute ingredient is selected from but not limited to soy proteins and rice proteins and combinations thereof. The dairy or dairy substitute ingredient is present in amount of from 50% to 98%, such as (but not limited to) from 60% to 90% or from 70% to 85% of the composition.

The second component of the present composition comprises an emulsifier. While not wishing to be bound by any theories, it is believed that the emulsifier reduces the surface tension at the air-liquid interface, therefore allowing for stable dispersion of air bubbles within the viscous liquid matrix. In certain non-limiting embodiments, the emulsifier is a lactylated mono and diglyceride. The lactylated mono and diglyceride is selected from the group consisting of but not limited to lactic and citrate acid esters of mono- and diglycerides, distilled monoglycerides, and combinations thereof. While not wishing to be bound by any theories, it is believed that the lactic acid moiety of the whipping agent resides in the aqueous phase at the interface of the aqueous phase and the hydrophobic phase while the mono and diglycerides reside in hydrophobic phase of the whipped dairy foam. The lactylated mono and diglycerides are present in an amount of from 0.001 to 1%, such as (but not limited to) from 0.01 to 0.5%, or from 0.1 to 0.4% of the composition. It is believed that the lactylated mono and diglyceride component of the presently disclosed and/or claimed inventive concept(s) promotes stabilization of the final aerated composition.

The combination of the first component and the second component are then pasteurized through procedures commonly used in the industry. Pasteurization can take between 1 to 10 minutes between 170° F. to 210° F., such as (but not limited to) between 180° F. to 205° F.

The composition of the presently disclosed and/or claimed inventive concept(s) can further comprise optional ingredients such as starch, including but not limited to corn starch, rice starch (native, physically or chemically modified) and tapioca starch; sugar/sweeteners, stabilizers, flavors, colors, fruit purees, prebiotics, probiotics, vegetable purees, fibers, fortificants such as DHA, minerals and vitamins, and gelatins such as porcine, fish and bovine.

Hardness, Dissolvability and Viscosity

The consumer preference for the final product of the presently disclosed and/or claimed inventive concept(s) is believed to be based on physical characteristics such as hardness, viscosity and dissolvability. While each characteristic is important, the correct balance between the three components is desired to optimize the end product of the presently disclosed and/or claimed inventive concept(s). Viscosity is defined as a measure of the resistance of a substance to flow. Viscosity is measured using a Brookfield viscometer with a Helipath® stand with an F-T bar before the composition is aerated. It is believed that while the viscosity aids in holding the shape of a substance through aeration and deposit, the hardness aids in physical stability. The dissolvability, also a hardness measurement, is the change in hardness of a product in going from a dry to a wet state. With increased aeration, which aids in dissolvability, the hardness can be negatively affected. The compositions and methods of the presently disclosed and/or claimed inventive concept(s) have unexpectedly discovered the optimum balance between viscosity, hardness and dissolvability to provide a physically stable and consumer acceptable product.

The composition of the presently disclosed and/or claimed inventive concept(s) has a hardness value of from 0.5 to 8 pounds force, such as (but not limited to) from 1.5 to 5.5 peak load. Peak load force can be measured using an Instron Universal Testing Machine fitted with a 100N load cell and a #2830-011 compression anvil. The traveling is at a speed of 1 mm/sec until initial piece fraction occurs.

The composition of the presently disclosed and/or claimed inventive concept(s) has a dissolvability in the range of from 0.1 to 8 peak load, such as (but not limited to) from 0.1 to 30 pounds force.

The composition of the presently disclosed and/or claimed inventive concept(s) has a viscosity of from 1,000 to 150,000 cp, dependent upon the temperature and speed of the viscometer used to measure the viscosity.

In certain non-limiting embodiments, the viscosity of the wet composition ranges from 30,000 to 60,000 cp at a 10 RPM speed of the spindle 6 in a Brookfield Viscometer. In a particular (but non-limiting) embodiment, the range is from 35,000 to 50,000 cp. In an alternate embodiment, the presently disclosed and/or claimed inventive concept(s) has a viscosity of from 1,000 to 700,000 cp, dependent upon the temperature and speed of the viscometer used to measure the viscosity. In a certain particular non-limiting embodiment for the alternate embodiment, the viscosity of the wet composition ranges from 100,000 to 400,000 cp at a 5 RPM speed of the spindle 6 in a Brookfield Viscometer. In a particular non-limiting embodiment of the alternate embodiment, the range is from 200,000 to 350,000 cp. It should be noted that the viscosity can be adjusted based on the RPM and is dependent upon dissolvability and the stabilizer.

Method of Making

A method of preparing a freeze-dried, aerated, milk product comprising the steps of (a) providing a dairy or dairy substitute blend, (b) adding an emulsifier, (c) thermally processing the dairy or dairy substitute blend, (d) fermenting the blend, (e) admixing a gas with the blend; (f) simultaneously aerating the gas and the dairy or dairy substitute blend to form an aerated product, and (f) cooling the product; and (g) freeze-drying the product.

Yogurt Production:

1. Pasteurized lowfat milk is transferred from a tanker truck to large hold tank.

2. All dry ingredients (sugar, gelatin, starch, nonfat dry milk, emulsifier, as well as functional ingredients such as prebiotics) are incorporated into milk via addition to a high shear blender (such as Bredo Liqwifier) to achieve homogenous dispersion and initial hydration.

3. Once all dry ingredients have been incorporated, the mixture is agitated for 30 minutes at 35-38° F.

4. Following agitation, the mixture is transferred to the HTST plate heat exchanger for thermal processing. The thermal process conditions used require that all achieve and maintain a minimum temperature of 191° F. at the end of a 4.5 minutes hold time. This temperature and hold time can vary depending upon the mechanics of the process, for example it is possible to go slightly higher in temperature and have a 7 or 8 minute hold time.

5. As an optional step for optimizing the formula and the consistency of aeration, homogenizing of the mixture can occur. The typical homogenization pressures are 2000 to 2500 psi at a first stage and 200-600 psi at a second stage.

6. After the hold time at 191° F., the mix is cooled to 100-112° F., and transferred to the culturing vat. At this point, the yogurt culture is added (for example, a freeze-dried culture, ABY-2C, supplied by Danisco Ingredients, or other vendors). The culture is blended with the pasteurized mix for 30-60 minutes, the mixing is stopped and the vat is maintained at 104-107° F. for 4-6 hours. Yogurt is allowed to acidify to pH 4.5 to 4.6, and is then agitated (broken) and cooled to 60° F. in the culture tank. Final pH will range from is 4.1-4.4.

7. Yogurt is transferred to 250 gal. blending tanks by pumping through a cooling press, which lowers temp to 37-45° F. Pasteurized fruit puree, flavors and any desired color will be added. Mixture will be blended with gentle agitation and recirculation for 10-15 minutes. Blended fruit yogurt is transferred to 275 gallon totes.

Production Frozen Yogurt Drops:

1. Yogurt will be conveyed/pumped from 275 gallon totes (previously stored at 34-40° F.) to the aerator (in this case, a Mondomix aerator, although other brands exist).

2. Nitrogen gas is admixed to the yogurt via the Mondo mixer (connected to plant ice water circulation system, to maintain mixing head temperature at 35-45° F.). Product overrun can range from 20% to 80%. However, in certain non-limiting embodiments, the overrun target will be between 30% and 50%, such as (but not limited to) between 35% and 45%. This process happens continuously.

3. Aerated yogurt is pumped, maintained at 38-50° F., under pressure, to a depositor manifold, where it is distributed to multiple nozzles which, via a metering pump, create the appropriately shaped deposit form (in this case, a large chocolate chip shape, although other shapes/forms are possible). The current target shape has a diameter of 13-22 mm (ideal is 15-20 mm), a height of 7-12 mm (ideal is 8-10), and a weight of 0.8-1.3 grams (ideal is 1.0-1.1 g).

4. Drops are deposited onto a solid, stainless steel freezer belt (in this case, the maker of the belt and freezer is Sandvik).

5. Freezer tunnel air temperature is approximately −20 to −30° F., with high velocity air circulation. Dwell time in the tunnel can range from 3-5 minutes. Frozen pieces exit the tunnel with an internal temperature of 24-28° F.

6. Products are removed from the freezer belt and conveyed to a bulk case packer, where they are filled into 20-30 lb, plastic bag lined cases. Cases are closed, taped and stored at −20° F. until shipment to OFD.

The following composition of the presently disclosed and/or claimed inventive concept(s) can be prepared. The percentages listed are based on the total weight of the composition.

Example 1

Unflavored Yogurt

| Ingredient | Percentage by weight |
|---|---|
| Low fat Milk | 82.89 |
| Non-fat dry milk (NFDM) | 4 |
| Sugar | 9 |
| Starch/Gelatin Stabilizer Blend | 3.7 |
| Yogurt Culture + Skim Milk | 0.01 |
| Lactem Emulsifier (Lactic Acid Esters of Monoglycerides) | 0.4 |

Example 2

| Ingredient | % of Formula |
|---|---|
| Lowfat Milk (1.65% fat) | 78.442148 |
| NFDM Low Heat | 3.68628 |
| Sugar, White Satin | 8.5068 |
| Starch/Gelatin Stabilizer Blend (0.38% Lactem, 1.1% Tapioca Starch, 2.3% gelatin) | 3.87532 |
| Peach Puree, Single Strength, Frozen, Organic | 5 |
| Natural Peach Flavor | 0.3 |
| Natural Annatto Extract | 0.18 |
| Yogurt Culture | 0.009452 |
| TOTAL | 100 |

Example 3

| Ingredient | % of Final Formula |
|---|---|
| Lowfat Milk (1.65% fat) | 78.442148 |
| NFDM, Low Heat | 3.68628 |
| Sugar, White Satin | 8.5068 |
| Starch/Gelatin Stabilizer Blend #1795 | 3.87532 |
| Peach Puree, Single Strength, Frozen, Organic | 5 |
| Natural Peach Flavor WONF C13206 | 0.3 |
| Natural Annatto Extract 1211663 | 0.18 |
| Yogurt Culture ABY-2C | 0.009452 |
| TOTAL | 100 |

The composition described above is made using the methods described herein.

It should be appreciated that the presently disclosed and/or claimed inventive concept(s) is not limited to the specific embodiments described above, but includes variations, modifications and equivalent embodiments defined by the following claims.

What is claimed is:

1. A method of providing a freeze-dried aerated yogurt product packaged for sale to a consumer, wherein the freeze-dried aerated yogurt composition is readily dissolvable to reduce the risk of choking hazards for consumers with restricted or under-developed oral motor skills or digestive functions, the method comprising the sequential steps of:
adding a dry emulsifier directly to one or more dairy or dairy substitute ingredients via high shear blending to form a mixture, wherein the dry emulsifier consists of lactylated monoglycerides and/or lactylated diglycerides;
pasteurizing the mixture;
adding a yogurt culture to the pasteurized mixture;
fermenting the pasteurized mixture containing the yogurt culture to provide a fermented mixture;
aerating the fermented mixture to provide an overrun from about 35% to about 45% prior to freeze-drying;
freeze-drying the aerated mixture to form the product; and
packaging the product for sale to a consumer, wherein the dairy or dairy substitute ingredient(s) is present in an amount of from about 70% to about 85% by weight of the product, and the dry emulsifier is present in an amount of from about 0.001% to about 1% of the freeze-dried, aerated yogurt product, and wherein the product is readily dissolvable to reduce the risk of choking hazards for consumers with restricted or under-developed oral motor skills or digestive functions and has a hardness value in a range of from about 0.5 to about 8 pounds force peak load, a dissolvability in a range of from about 0.1 to about 8 pounds force peak load, and a viscosity in a range of from about 1000 to about 400,000 cp at a 5 RPM speed of the spindle 6 in a Brookfield Viscometer.

2. The method of claim 1, wherein the yogurt product is shaped in a chocolate chip shape having a diameter of from 13 mm to 22 mm, a height of from 7 mm to 12 mm, and a weight of from about 0.8 to about 1.3 g.

3. The method of claim 1, wherein the product further comprises a prebiotic that is mixed with the dry emulsifier and the dairy or dairy substitute ingredient(s) to provide the mixture.

4. The method of claim 1, wherein the product further comprises a probiotic that is added to the pasteurized mixture along with the yogurt culture.

5. The method of claim 1, wherein the product further comprises at least one additional ingredient selected from the group consisting of a starch, a sugar, a sweetener, a stabilizer, a fiber, a fortificant, a gelatin, and combinations thereof, wherein said one or more additional ingredients is mixed with the dry emulsifier and the dairy or dairy substitute ingredient(s) to provide the mixture.

6. The method of claim 1, wherein the product further comprises at least one additional ingredient selected from the group consisting of a fruit puree, a vegetable puree, a flavor, a color, and combinations thereof, wherein the one or more additional ingredients is added to the pasteurized mixture along with the yogurt culture.

7. The method of claim 1, wherein the dry emulsifier consists of lactic acid esters of monoglycerides (LACTEM).

8. The method of claim 1, wherein the product has a viscosity when wet in a range of from 30,000 to 60,000 cp at a 10 RPM speed of the spindle 6 in a Brookfield Viscometer.

9. The method of claim 1, wherein the dry emulsifier is present in an amount of from about 0.1% to about 0.4% of the freeze-dried, aerated yogurt product.

10. The method of claim 1, wherein:
(a) the step of pasteurizing the mixture is further defined as pasteurizing the mixture by heating at a temperature in a range of from 170° F. to 210° F. for 1 to 10 minutes; and
(b) the step of fermenting the pasteurized mixture is further defined as fermenting the pasteurized mixture at a temperature in a range of from 104° F. to 107° F. for 4 to 6 hours.

11. A method of providing a freeze-dried aerated yogurt product packaged for sale to a consumer, wherein the freeze-dried aerated yogurt composition comprises at least one probiotic and is readily dissolvable to reduce the risk of choking hazards for consumers with restricted or under-developed oral motor skills or digestive functions, the method comprising the sequential steps of:
adding a dry emulsifier directly to one or more dairy or dairy substitute ingredients via high shear blending to form a mixture, wherein the dry emulsifier consists of lactylated monoglycerides and/or lactylated diglycerides;
pasteurizing the mixture;
adding a yogurt culture and at least one probiotic to the pasteurized mixture;
fermenting the pasteurized mixture containing the yogurt culture and the at least one probiotic to provide a fermented mixture;
aerating the fermented mixture to provide an overrun from about 35% to about 45% prior to freeze-drying;
freeze-drying the aerated mixture to form the product; and
packaging the product for sale to a consumer, wherein the dairy or dairy substitute ingredient(s) is present in an amount of from about 70% to about 85% by weight of the product, and the dry emulsifier is present in an amount of from about 0.001% to about 1% of the freeze-dried, aerated yogurt product, and wherein the product is readily dissolvable to reduce the risk of choking hazards for consumers with restricted or under-developed oral motor skills or digestive functions and has a hardness value in a range of from about 0.5 to about 8 pounds force peak load, a dissolvability in a range of from about 0.1 to about 8 pounds force peak load, and a viscosity in a range of from about 1000 to about 400,000 cp at a 5 RPM speed of the spindle 6 in a Brookfield Viscometer.

12. The method of claim 11, wherein the yogurt product is shaped in a chocolate chip shape having a diameter of from 13 mm to 22 mm, a height of from 7 mm to 12 mm, and a weight of from about 0.8 to about 1.3 g.

13. The method of claim 11, wherein the product further comprises at least one additional ingredient selected from the group consisting of a prebiotic, a starch, a sugar, a sweetener, a stabilizer, a fiber, a fortificant, a gelatin, and combinations thereof, wherein said one or more additional ingredients is mixed with the dry emulsifier and the dairy or dairy substitute ingredient(s) to provide the mixture.

14. The method of claim 11, wherein the product further comprises at least one additional ingredient selected from the group consisting of a fruit puree, a vegetable puree, a flavor, a color, and combinations thereof, wherein the one or more additional ingredients is added to the pasteurized mixture along with the yogurt culture.

15. The method of claim 11, wherein the dry emulsifier consists of lactic acid esters of monoglycerides (LACTEM).

16. The method of claim 11, wherein the product has a viscosity when wet in a range of from 30,000 to 60,000 cp at a 10 RPM speed of the spindle 6 in a Brookfield Viscometer.

17. The method of claim 11, wherein the dry emulsifier is present in an amount of from about 0.1% to about 0.4% of the freeze-dried, aerated yogurt product.

18. The method of claim 11, wherein:
(a) the step of pasteurizing the mixture is further defined as pasteurizing the mixture by heating at a temperature in a range of from 170° F. to 210° F. for 1 to 10 minutes; and
(b) the step of fermenting the pasteurized mixture is further defined as fermenting the pasteurized mixture at a temperature in a range of from 104° F. to 107° F. for 4 to 6 hours.

19. A method of providing a freeze-dried aerated yogurt product packaged for sale to a consumer, wherein the freeze-dried aerated yogurt composition comprises at least one probiotic and is readily dissolvable to reduce the risk of choking hazards for consumers with restricted or under-developed oral motor skills or digestive functions, the method comprising the sequential steps of:
adding a dry emulsifier directly to one or more dairy or dairy substitute ingredients and at least one additional ingredient and mixing via high shear blending to form a mixture, wherein the dry emulsifier consists of lactic acid esters of monoglycerides (LACTEM), and wherein the at least one additional ingredient selected from the group consisting of a prebiotic, a starch, a sugar, a sweetener, a stabilizer, a fiber, a fortificant, a gelatin, and combinations thereof;
pasteurizing the mixture by heating at a temperature in a range of from 170° F. to 210° F. for 1 to 10 minutes;
adding a yogurt culture, at least one probiotic, and at least one additional ingredient to the pasteurized mixture, wherein the at least one additional ingredient is selected from the group consisting of a fruit puree, a vegetable puree, a flavor, a color, and combinations thereof;
fermenting the pasteurized mixture containing the yogurt culture and the at least one probiotic at a temperature in a range of from 104° F. to 107° F. for 4 to 6 hours to provide a fermented mixture;
aerating the fermented mixture to provide an overrun from about 35% to about 45% prior to freeze-drying;
freeze-drying the aerated mixture to form the product, wherein the product is shaped in a chocolate chip shape having a diameter of from 13 mm to 22 mm, a height of from 7 mm to 12 mm, and a weight of from about 0.8 to about 1.3 g; and packaging the product for sale to a consumer, wherein the dairy or dairy substitute ingredient(s) is present in an amount of from about 70% to about 85% by weight of the product, and the dry emulsifier is present in an amount of from about 0.1% to about 0.4% of the freeze-dried, aerated yogurt product, and wherein the product is readily dissolvable to reduce the risk of choking hazards for consumers with restricted or under-developed oral motor skills or digestive functions and has a hardness value in a range of from about 0.5 to about 8 pounds force peak load, a dissolvability in a range of from about 0.1 to about 8 pounds force peak load, and a viscosity in a range of from about 1000 to about 400,000 cp at a 5 RPM speed of the spindle 6 in a Brookfield Viscometer.

20. The method of claim 19, wherein the product has a viscosity when wet in a range of from 30,000 to 60,000 cp at a 10 RPM speed of the spindle 6 in a Brookfield Viscometer.

* * * * *